Patented Jan. 28, 1947

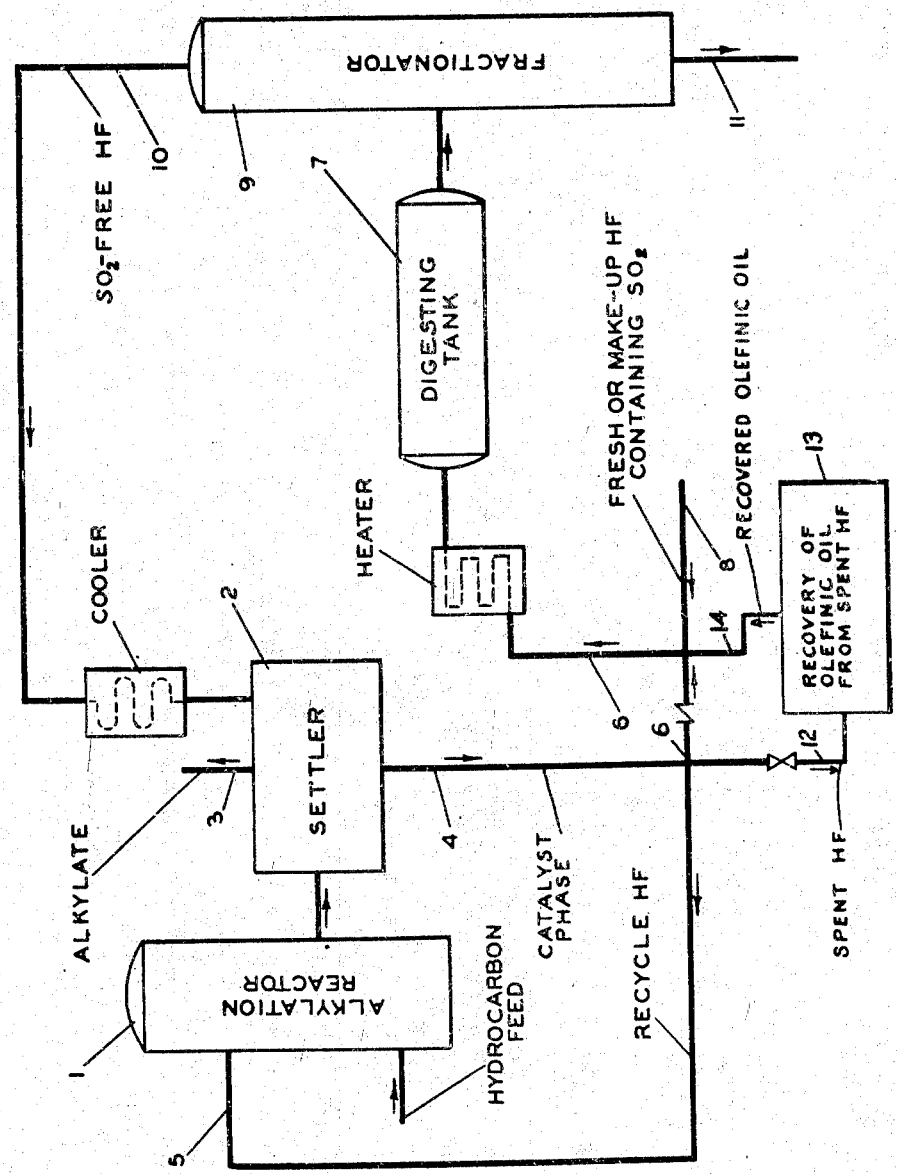

2,415,003

UNITED STATES PATENT OFFICE 2,415,003

PURIFICATION OF HYDROFLUORIC ACID

Ralph C. Cole, Bartlesville, Okla., assignor to Phillips Petroleum Company, a corporation of Delaware Application December 11, 1943, Serial No. 513,937

14 Claims. (Cl. 260—683.4)

This invention relates to the purification of hydrofluoric acid and more particularly to the removal of sulfur dioxide therefrom. This application is a continuation-in-part of my co-pending application Serial Number 487,144, filed May 15, 1943, now U. S. Patent No. 2,376,328.

The principal object of the present invention is to provide an improved method of removing sulfur dioxide from hydrofluoric acid. Another object is to accomplish such removal more cheaply and more efficaciously. Another object is to effect such removal by means of a material formed as a by-product in the alkylation of paraffins with olefins with hydrofluoric acid as a catalyst. Another object is to provide a process of the foregoing type integrated in a highly advantageous manner with an alkylation unit and process wherein paraffins are catalytically alkylated with olefins using hydrofluoric acid as the catalyst. Numerous other objects will hereinafter appear.

Hydrofluoric acid, as commercially prepared by the action of concentrated sulfuric acid on flourspar or fluorite or similar minerals, always contains a small proportion of sulfur dioxide, which in the best grades of commercial anhydrous hydrofluoric acid usually is not more than 0.1 per cent by weight, but sometimes is of the order of 0.5 to 1 per cent or more. When the hydrofluoric acid is to be used as a catalyst for effecting conversion of organic compounds, the presence of sulfur dioxide in the acid is undesirable. The sulfur becomes concentrated in the product of the catalytic conversion, thereby increasing the corrosiveness of the product, decreasing the octane number and/or lead response of the product (when used as a motor fuel), and necessitating a considerable expense for desulfurization of the product.

The above-identified application of which the present application is a continuation-in-part, discloses removal of sulfur dioxide from hydrofluoric acid by reaction with a hydrocarbon material, preferably at least partly olefinic, forming high-boiling sulfur-containing compounds from which pure hydrofluoric acid is subsequently separated by distillation. I have now found that the acid-soluble oil present in used alkylation hydrofluoric acid is a particularly efficacious olefinic material for use in removal of sulfur dioxide in this manner, and I have found that such use results in an advantageously self-contained combination of cooperating alkylation, acid-purification, and acid-rerunning steps.

According to a preferred mode of operation of this invention, sulfur dioxide is removed from hydrofluoric acid by mixing with it partially spent alkylation hydrofluoric acid, which contains a heavy olefinic acid-soluble oil formed during alkylation. The sulfur dioxide in the hydrofluoric acid reacts with the acid-soluble oil to form complex sulfur-containing compounds from which pure hydrofluoric acid is separated by distillation.

The drawing illustrates one mode of operation of the process in connection with an alkylation unit. The alkylation mixture is passed from the alkylation reactor 1 to a settler 2 for separation into two liquid phases. The hydrocarbon phase leaving via line 3 is subsequently treated to remove dissolved catalyst and organic fluorine, as by azeotrope towers, bauxite treaters, and the like. The catalyst phase leaving via line 4 is in part recycled via line 5 to the alkylation unit 1 and the balance is passed via line 6 to a digesting tank 7 wherein it is mixed with fresh or make-up acid containing sulfur dioxide as an impurity and fed in via line 8. The resulting mixture is agitated for a time sufficient for the sulfur dioxide to react with the acid-soluble oil in the used acid. The temperature in the digesting tank may be in the range of about 50° F. to 250° F.; usually and preferably it is in the range of about 100° F. to 150° F. The mixture is passed from the digesting tank to the acid-rerun system or acid-regeneration means, comprising fractional distillation column 9 wherefrom sulfur dioxide-depleted hydrofluoric acid is distilled overhead via line 10 and a residue comprising an olefin-sulfur dioxide complex is withdrawn via line 11 as a kettle product. This method of sulfur dioxide removal utilizes only fractionating equipment already present in the alkylation unit. The sulfur dioxide-free hydrofluoric acid removed overhead from fractional distillation system 9 is condensed and recycled via line 10 to settler 2.

By the present invention hydrofluoric acid containing not over 0.05 weight per cent of sulfur dioxide is readily produced. In fact the sulfur dioxide content is usually substantially less than this figure.

If desired, under some circumstances, the reaction between the olefinic oil contained in the partially spent acid and the sulfur dioxide contained in the fresh or make-up acid may be carried out simultaneously with the fractional distillation. Thus the fresh hydrofluoric acid and the partially spent acid may be fed either in admixture or separately to column 9 and this column so operated that the sulfur dioxide contained in the fresh acid is reacted with the olefinic oil before it has a chance to pass out with the overhead. For example the spent acid may be introduced at a point substantially above the fresh acid or even at a point adjacent the top of the column whereby the heavy olefinic oil descending in the column counter-currently contacts the ascending volatilized fresh hydrofluoric acid.

In another embodiment the spent hydrofluoric acid catalyst phase drawn off from the stream in line 4 is passed via line 12 to unit 13 wherein it is treated in known manner to separate heavy olefinic acid-soluble oil which is passed via line 14 into admixture with the $SO_2$-containing acid entering via line 8.

Methods of treating spent alkylation hydrofluoric acid to recover the high-boiling acid-soluble oil contained therein are well-known to the art. See for example the article "Commercial alkylation with hydrogen fluoride catalyst" by F. E. Frey, which appeared in Chemical and Metallurgical Engineering for November, 1943, pages 126 and 127 (vol. 50, No. 11). On page 126, Frey states that "With continued use the acid acquires acid-soluble organic contaminants which are removed by distillation." On page 127, the author refers to the spent acid rerun system in which the acid is distilled overhead, the high-boiling contaminants being removed as a kettle product. See also Australian Patent 117,359 (accepted August 5, 1943) which shows passing hydrogen fluoride catalyst phase containing organic contaminating materials to a fractional distillation column wherein purified hydrogen fluoride is distilled overhead from a bottom hydrocarbon fraction consisting essentially of heavy polymers.

It will be seen that the present invention provides numerous advantages over conventional practice which is to add the fresh make-up hydrofluoric acid to the settler 2 whereby the sulfur dioxide contained in the fresh acid objectionably contaminates the alkylate. With my invention the only hydrofluoric acid added to settler 2 is that from the top of column 9 which contains not more than and generally substantially less than 0.05 weight per cent of sulfur dioxide even though the fresh acid contains as much as 1 per cent or more. Thus my invention produces alkylate much lower in sulfur content than conventional practice. My invention accomplishes removal of the sulfur dioxide contained in both the make-up acid and the regenerated acid by subjecting the mixture of spent acid and fresh acid to an elevated temperature for a period of time sufficient to effect the reaction herein described whereby the sulfur dioxide is fixed in non-volatile form. While it is not desired to be limited to any theory it is believed that the digestion at elevated temperature liberates HF combined with the olefinic oil rendering the latter free to react with the sulfur dioxide which reaction is expedited by elevated temperatures.

It will be understood that the alkylation system represented by reactor 1, settler 2, and lines 3, 4, 5 and 6 is conventional and forms per se no part of the present invention. Operation of this portion of the process is well within the skill of the art and does not need to be here detailed.

The invention may be practiced batchwise, intermittently, or continuously.

The following illustrative examples show typical ways of practicing the present invention.

Example 1

To 7.066 pounds of anhydrous hydrofluoric acid containing 0.193 per cent by weight of sulfur dioxide was added 0.47 pound of acid-soluble oil obtained from used acid from a commercial hydrofluoric acid alkylation plant for alkylating isobutane with olefins, principally butylenes; the oil contained 0.170 per cent by weight of sulfur. The calculated sulfur dioxide content of the mixture was 0.181 per cent by weight. The mixture was shaken for two hours at room temperature and then was allowed to stand for two days until it could be conveniently fractionally distilled. The mixture was distilled at about 135 to 140° F. and 30 p. s. i., giving 5.91 pounds of hydrofluoric acid overhead with a sulfur dioxide content of only 0.022 per cent by weight. Further distillation, up to a temperature of 300° F., gave 0.9 pound of hydrofluoric acid overhead with a sulfur dioxide content of 0.155 per cent by weight. The resulting residue, when heated to 400° F. liberated 0.025 pound of a gas containing 19.65 per cent by weight of sulfur dioxide and 3.78 per cent by weight of hydrogen sulfide, showing that the sulfur-containing compounds decompose at this temperature. The residual oil, after being heated to 400° F., contained 0.674 per cent by weight of sulfur, or about four times its original content.

Example 2

In a commercial alkylation unit for the alkylation of isobutane with olefins, principally butylenes, fresh hydrofluoric acid to make up for acid lost in any manner whatever is added to the stream of used acid being removed from the settler for regeneration, substantially as indicated in the drawing. The resulting mixture passes to a digesting tank in which it is retained until the sulfur dioxide in the fresh acid has reacted with the acid-soluble oil in the used acid. Then this mixture is passed to the acid-rerun system, wherein substantially pure hydrofluoric acid is distilled from the oil at about 135° F. and 30 p. s. i. Distillation and heating is then continued to about 300° F., to give a relatively small fraction of hydrofluoric acid having a low but appreciable content of sulfur dioxide; this fraction is recycled to the digesting tank. The residue, containing most of the original sulfur dioxide as high-boiling sulfur-containing compounds, is removed as a by-product of the process.

I claim:

1. The process of removing sulfur dioxide from hydrofluoric acid containing the same which comprises admixing said hydrofluoric acid with at least partially spent hydrofluoric acid which has been used in alkylation of paraffins with olefins with hydrofluoric acid, said spent hydrofluoric acid containing a heavy olefinic oil soluble in hydrofluoric acid, digesting the resulting mixture for a period of time sufficient to effect reaction between substantially all of said sulfur dioxide and said olefinic oil to form complex sulfur-containing compounds, and separating hydrofluoric acid substantially free from sulfur dioxide from a residual material containing substantially all of said sulfur-containing compounds.

2. The process of removing sulfur dioxide from hydrofluoric acid containing the same which comprises admixing said hydrofluoric acid with at least partially spent hydrofluoric acid derived from alkylation of paraffins with olefins in the presence of hydrofluoric acid, said spent hydrofluoric acid containing a heavy olefinic oil soluble in hydrofluoric acid, digesting the resulting mixture for a period of time sufficient to effect reaction between substantially all of said sulfur dioxide and said olefinic oil to form complex sulfur-containing compounds, and fractionally distilling the digested mixture to separate substantially pure hydrofluoric acid as an overhead from a bottom product containing substantially all of said complex compounds.

3. The process of removing sulfur dioxide from hydrofluoric acid containing the same which comprises admixing said hydrofluoric acid with at least partially spent hydrofluoric acid derived from alkylation of paraffins with olefins in the presence of hydrofluoric acid, said spent hydrofluoric acid containing a heavy olefinic oil soluble in hydrofluoric acid, digesting the resulting mixture at a temperature of from 50 to 250° F. for a period of time sufficient to effect reaction between substantially all of said sulfur dioxide and said olefinic oil to form complex sulfur-containing compounds, and fractionally distilling the digested mixture to separate substantially pure hydrofluoric acid as an overhead from a bottom product containing substantially all of said complex compounds.

4. The process of removing sulfur dioxide from hydrofluoric acid containing the same which comprises admixing said hydrofluoric acid with at least partially spent hydrofluoric acid derived from alkylation of paraffins with olefins in the presence of hydrofluoric acid, said spent hydrofluoric acid containing a heavy olefinic oil soluble in hydrofluoric acid, digesting the resulting mixture at a temperature of from 100 to 150° F. for a period of time sufficient to effect reaction between substantially all of said sulfur dioxide and said olefinic oil to form complex sulfur-containing compounds, and fractionally distilling the digested mixture to separate substantially pure hydrofluoric acid as an overhead from a bottom product containing substantially all of said complex compounds.

5. The process of removing sulfur dioxide from hydrofluoric acid containing the same in amount substantially exceeding 0.05 weight per cent which comprises admixing said hydrofluoric acid with at least partially spent hydrofluoric acid derived from alkylation of paraffins with olefins in the presence of hydrofluoric acid, said spent hydrofluoric acid containing a heavy olefinic oil soluble in hydrofluoric acid, digesting the resulting mixture at a temperature of from 100 to 150° F. for a period of time sufficient to effect reaction between substantially all of said sulfur dioxide and said olefinic oil to form complex sulfur-containing compounds which are relatively non-volatile, fractionally distilling the resulting reaction mixture, recovering as an overhead hydrofluoric acid containing less than 0.05 weight per cent of sulfur dioxide, and removing a bottoms product containing substantially all of said sulfur-containing compounds.

6. In alkylation of paraffins with olefins by means of hydrofluoric acid as a catalyst wherein the reaction effluent from the alkylation zone is passed to a separating zone and there separated into a hydrocarbon phase containing the alkylate product and a catalyst phase, said phases are separately withdrawn from the separating zone and the catalyst phase in part recycled to the alkylation zone and in part passed to a re-run step where a fraction of hydrofluoric acid is distilled off overhead and recycled to the alkylation and separation system, the improvement which comprises intimately commingling at a point outside of said alkylation and separation systems the entire fresh sulfur dioxide-containing hydrofluoric acid to be added to the system as make-up with the portion of said catalyst phase passed to said re-run step and digesting the resulting mixture, prior to passage thereof to said re-run step, at an elevated temperature of from 100 to 150° F. for a period of time sufficient to effect combination of substantially all of the sulfur dioxide contained in said fresh hydrofluoric acid with the heavy olefinic oil contained in said portion of said catalyst phase, and thereby lowering the sulfur dioxide content of the hydrofluoric acid fraction distilled off in said re-run step and recycled to said alkylation and separation systems to less than 0.05 weight per cent of sulfur dioxide.

7. The process of removing sulfur dioxide from hydrofluoric acid containing the same which comprises admixing said hydrofluoric acid with heavy olefinic oil recovered from spent hydrofluoric acid which has been used in alkylation of paraffins with olefins with hydrofluoric acid, digesting the resulting mixture at an elevated temperature of from 100 to 150° F. for a period of time sufficient to effect reaction between substantially all of said sulfur dioxide and said olefinic oil to form complex sulfur-containing compounds, fractionally distilling the resulting reaction mixture, recovering as an overhead hydrofluoric acid containing less than 0.05 weight per cent of sulfur dioxide, and removing a bottoms product containing substantially all of said sulfur-containing compounds.

8. The process of removing sulfur dioxide from hydrofluoric acid containing the same which comprises admixing said hydrofluoric acid with a material selected from the group consisting of heavy olefinic oil formed in the alkylation of paraffins with olefins with hydrofluoric acid, and spent hydrofluoric acid containing olefinic contaminants, digesting the resulting mixture for a period of time sufficient to effect reaction between substantially all of said sulfur dioxide and said material selected from said group to form complex sulfur-containing compounds, fractionally distilling the resulting reaction mixture, recovering as an overhead hydrofluoric acid containing less than 0.05 weight per cent of sulfur dioxide, and removing a bottoms product containing substantially all of said sulfur-containing compounds.

9. A process which comprises alkylating paraffins with olefins which comprises alkylating a paraffin with an olefin in the presence of hydrofluoric acid as a catalyst, withdrawing spent hydrofluoric acid from the alkylation process, said spent hydrofluoric acid containing in solution a heavy olefinic oil, recovering said olefinic oil from said spent acid, admixing said olefinic oil with fresh hydrofluoric acid containing an objectionable amount of sulfur dioxide as an impurity, digesting the resulting mixture for a period of time sufficient to effect reaction between substantially all of said sulfur dioxide and said olefinic oil to form complex sulfur-containing compounds, fractionally distilling the resulting reaction mixture, recovering as an overhead hydrofluoric acid containing less than 0.05 weight per cent of sulfur dioxide and removing a bottoms product containing substantially all of said sulfur-containing compounds, and passing said hydrofluoric acid recovered as said overhead product to said alkylation step as the catalyst therefor.

10. In an alkylation process comprising the steps of alkylating paraffins with olefins with substantially anhydrous hydrofluoric acid as the catalyst, passing the alkylation effluent to a settling zone and there separating it into two phases namely a hydrocarbon phase containing the alkylate and a catalyst phase, separately withdrawing said phases, recycling a portion of said withdrawn catalyst phase to said alkylation step, passing the balance of said withdrawn catalyst phase to a fractional distillation zone and therein distilling overhead a low-boiling fraction of substantially pure hydrofluoric acid from a bottoms fraction containing high-boiling impurities derived from said catalyst phase, and recycling said overhead fraction of hydrofluoric acid to said alkylation and separation system, the improvement which comprises commingling the entire amount of fresh hydrofluoric acid containing substantially more than 0.05 weight per cent of sulfur dioxide used as make-up for said alkylation step with said balance of said withdrawn catalyst phase at a point outside of said alkylation and separation system, digesting the resulting hydrofluoric acid mixture at a temperature of from 50 to 250° F. for a period of time sufficient to effect reaction of substantially all of said sulfur dioxide with olefinic acid-soluble oil formed during said alkylation and contained in said balance of said withdrawn catalyst phase to form high-boiling complex sulfur-containing compounds, and employing the resulting digested mixture as the feed to said fractional distillation zone and thereby substantially freeing said recycled acid fraction from sulfur dioxide.

11. In a process for effecting the conversion of an organic compound in the presence of concentrated hydrofluoric acid as a conversion catalyst, the improvement for avoiding contamination of products of said conversion by sulfur compounds resulting from sulfur dioxide present as an impurity in make-up hydrofluoric acid catalyst, which comprises separating from effluents of said conversion liquid hydrofluoric acid catalyst, recycling a portion of said liquid hydrofluoric acid catalyst to said conversion, passing a further portion of said hydrofluoric acid to a fractional distillation means to remove impurities therefrom, intimately commingling the entire amount of fresh sulfur dioxide-containing hydrofluoric acid from an extraneous source to be added to the system as make-up with a material selected from the group consisting of heavy olefinic oil formed in the alkylation of paraffins with olefins with hydrofluoric acid, and spent hydrofluoric acid containing olefinic contaminants and maintaining the resulting mixture under reaction conditions such as to effect combination of substantially all of said sulfur dioxide contained in said fresh hydrofluoric acid with said material to form organic sulfur compounds, passing the mixture resulting from said treatment and containing said organic sulfur compounds to the aforesaid fractional distillation means, removing as a low-boiling fraction from said fractional distillation means substantially pure sulfur dioxide-free hydrofluoric acid and passing same to said conversion.

12. A process for alkylating alkylatable hydrocarbons with olefins in the presence of concentrated hydrofluoric acid and avoiding contamination of the alkylate by sulfur compounds resulting from sulfur dioxide present as an impurity in make-up hydrofluoric acid catalyst, which comprises reacting an alkylatable hydrocarbon and an olefin under alkylation conditions in the presence of essentially sulfur-free hydrofluoric acid as alkylation catalyst, separating from effluents of said alkylation liquid hydrofluoric acid catalyst, recycling a portion of said liquid hydrofluoric acid catalyst to said alkylation, passing a further portion of said hydrofluoric acid to a fractional distillation means to remove impurities therefrom, intimately commingling with the entire amount of fresh sulfur dioxide-containing hydrofluoric acid from an extraneous source to be added to the system as make-up with a material selected from the group consisting of heavy olefinic oil formed in the alkylation of paraffins with olefins with hydrofluoric acid, and spent hydrofluoric acid containing olefinic contaminants and maintaining the resulting mixture under reaction conditions such as to effect combination of substantially all of the sulfur dioxide contained in said fresh hydrofluoric acid with said material to form organic sulfur compounds, passing the mixture resulting from said treatment and containing said organic sulfur compounds to the aforesaid fractional distillation means, removing as a low-boiling fraction from said distillation means substantially pure sulfur dioxide-free hydrofluoric acid and passing same to said alkylation.

13. A process for alkylating alkylatable hydrocarbons with olefins in the presence of concentrated hydrofluoric acid and avoiding contamination of the alkylate by sulfur compounds resulting from sulfur dioxide present as an impurity in make-up hydrofluoric acid catalyst, which comprises reacting an alkylatable hydrocarbon and an olefin under alkylation conditions in the presence of essentially sulfur-free hydrofluoric acid as alkylation catalyst, separating from effluents of said alkylation liquid hydrofluoric acid catalyst, recycling a portion of said liquid hydrofluoric acid catalyst to said alkylation, passing a further portion of said hydrofluoric acid to a fractional distillation means to remove impurities therefrom, intimately commingling the entire amount of fresh sulfur dioxide-containing hydrofluoric acid from an extraneous source to be added to the system as make-up with said further portion of said hydrofluoric acid and maintaining the resulting mixture under reaction conditions such as to effect combination of substantially all of the sulfur dioxide contained in said fresh hydrofluoric acid with olefinic contaminants contained in said further portion of said hydrofluoric acid to form organic sulfur compounds, passing the mixture resulting from said treatment and containing said organic sulfur compounds to the aforesaid fractional distillation means, removing as a low-boiling fraction from said distillation means substantially pure sulfur dioxide-free hydrofluoric acid and passing same to said alkylation.

14. A process for alkylating alkylatable hydrocarbons with olefins in the presence of concentrated hydrofluoric acid and avoiding contamination of the alkylate by sulfur compounds resulting from sulfur dioxide present as an impurity in make-up hydrofluoric acid catalyst, which comprises reacting an alkylatable hydrocarbon and an olefin under alkylation conditions in the presence of essentially sulfur-free hydrofluoric acid as alkylation catalyst, separating from effluents of said alkylation liquid hydrofluoric acid catalyst, recycling a portion of said liquid hydrofluoric acid catalyst to said alkylation, passing a further portion of said hydrofluoric acid to a fractional distillation means to remove impurities therefrom, intimately commingling the entire amount of fresh sulfur dioxide-containing hydrofluoric acid from an extraneous source to be added to the system as make-up with a heavy olefinic oil formed in the alkylation of paraffins with olefins with hydrofluoric acid and maintaining the resulting mixture under reaction conditions such as to effect combination of substantially all of the sulfur dioxide contained in said fresh hydrofluoric acid with said heavy olefinic oil to form organic sulfur compounds, passing the mixture resulting from said treatment and containing said organic sulfur compounds to the aforesaid fractional distillation means, removing as a low-boiling fraction from said distillation means substantially pure sulfur dioxide-free hydrofluoric acid and passing same to said alkylation.

RALPH C. COLE.